No. 855,223. PATENTED MAY 28, 1907.
JOHN HENRY BIRCH & JOHN HAYS BIRCH.
GAS ENGINE.
APPLICATION FILED MAR. 21, 1907.
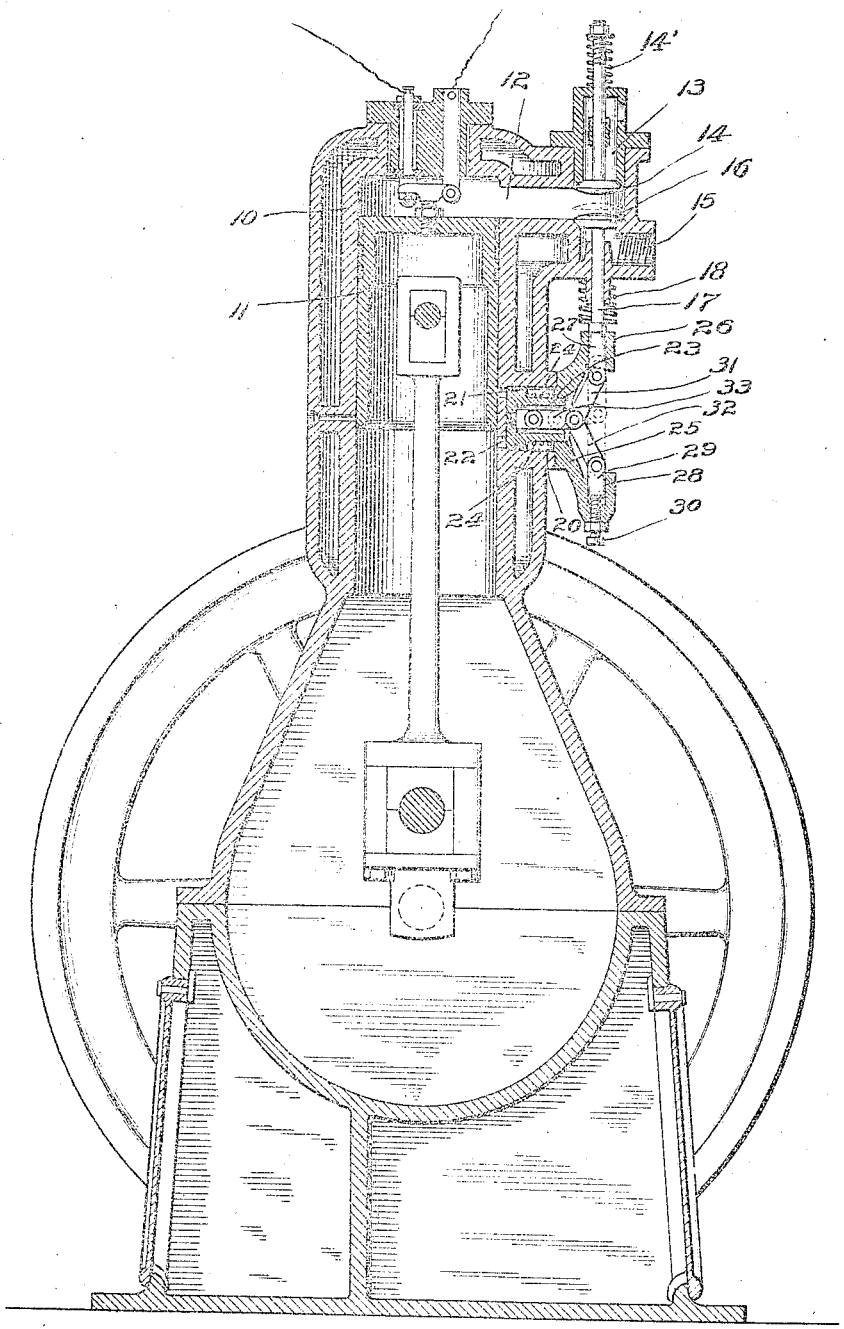

UNITED STATES PATENT OFFICE.

JOHN HENRY BIRCH AND JOHN HAYS BIRCH, OF CRAWFORDSVILLE, INDIANA.

GAS-ENGINE.

No. 855,223.     Specification of Letters Patent.     Patented May 28, 1907.

Application filed March 21, 1907. Serial No. 363,590.

*To all whom it may concern:*

Be it known that we, JOHN HENRY BIRCH and JOHN HAYS BIRCH, citizens of the United States, residing at Crawfordsville, in the county of Montgomery and State of Indiana, have invented certain new and useful Improvements in Gas-Engines, of which the following is a specification.

The object of our invention is to produce an efficient yet simple means for operating the exhaust valves of gas engines by means of pressure generated in the combustion chamber by a combustion of the charge.

The accompanying drawing, which is a longitudinal section through the cylinder, illustrates our invention.

In the drawings 10 indicates any desired form of cylinder having a piston 11 mounted therein. Communicating with cylinder 10 at its sparking end, is a passage 12 into which leads an inlet passage 13 provided with an inwardly opening valve 14 of any desired form. Leading from passage 12 is an exhaust passage 15 having an inwardly opening exhaust valve 16 provided with a stem 17, a spring 18 being provided to normally hold the valve 16 closed, the spring 18 being stronger than the spring 14' which is used to normally hold the inlet valve 14. Formed in the side of cylinder 10 is a small cylinder 20 communicating with the combustion chamber by means of an inlet passage 21 and with the crank base by an outlet passage 22. Mounted in cylinder 20 is a small piston 23 which is normally held in its inner position by a light spring 24. Secured to the outer end of cylinder 20 is a bracket 25 provided with a bearing 26 arranged in alinement with the valve stem 17. Slidingly mounted in bearing 26 is a pin 27. Bracket 25 is also provided with a socket 28 which is alined with bearing 26 and mounted in this socket is a pin 29 which may be vertically adjusted in socket 28 by any suitable means, such for instance as the adjusting screw 30. Pivoted to the inner ends of pins 27 and 29 are two links 31 and 32 respectively, which are connected at their inner ends to a link 33 which, in turn, is pivoted to the piston 23, thus forming a toggle connection between the piston 24 and the pin 27.

The operation is as follows:—The normal positions of the parts are indicated in full lines. Supposing a charge to have entered the cylinder and to have been compressed, the downward stroke of the piston 11 will be a power stroke and, when the piston 11 has moved to the end of its stroke, it will uncover the port 21 and thereupon the pressure of the ignited charge will pass through said port into cylinder 20 so as to urge piston 23 to the right, thus straightening the toggle lever and causing pin 27 to move the exhaust valve to the position indicated in dotted lines, thus permitting the escape of the burnt gases. Before there is any material reduction of pressure, however, piston 11 will move backward so as to close port 21 and, port 22 being also closed, the pressure within cylinder 20 will be maintained so as to hold the exhaust valve open until the piston 11 has nearly reached the end of its return stroke, whereupon said piston will uncover the exhaust port 22 of cylinder 20 so that the pressure within said cylinder may exhaust into the crank base and spring 24 operate to return the parts to normal position, whereupon spring 18 will close the exhaust valve. On the next down stroke of the power piston a new charge will be drawn into the combustion chamber and this new charge, having no pressure above atmospheric pressure, will not operate piston 23 when port 21 is uncovered so that the exhaust valve 16 will remain closed during the compression stroke of the power piston.

We claim as our invention:—

1. In an internal combustion engine, the combination, with the combustion chamber, the power piston therein and an exhaust valve controlling the passage leading from said combustion chamber, of a supplemental cylinder having a passage leading to the combustion chamber and having an exhaust passage, both of said passages of the supplemental cylinder being opened and closed by the movement of the power piston, a piston mounted in the supplemental cylinder, and a pair of toggle links connected with said piston and arranged to operate the exhaust valve.

2. In an internal combustion engine, the combination, with the combustion chamber, the power piston therein and an exhaust valve controlling the passage leading from said combustion chamber, of a supplemental cylinder having a passage leading to the combustion chamber and having an exhaust passage, both of said passages of the supplemental cylinder being opened and closed by the movement of the power piston, a piston mounted in the supplemental cylinder, a pair of toggle links connected with said piston, an adjustable abutment for one end of said toggle, a sliding pin adapted to engage the exhaust valve stem, and a suitable support for said pin.

In witness whereof, we have hereunto set our hands and seals at Crawfordsville, Indiana, this 16th day of March, A. D. one thousand nine hundred and seven.

JOHN HENRY BIRCH. [L. S.]
  JOHN HAYS BIRCH. [L. S.]

Witnesses:
  Jos. E. Foulkes,
  William Hawkins.